United States Patent
Yuasa et al.

(10) Patent No.: US 6,895,909 B2
(45) Date of Patent: May 24, 2005

(54) TWO-CYCLE COMBUSTION ENGINE HAVING TWO-STAGED PISTON

(75) Inventors: Tsuneyoshi Yuasa, Kobe (JP); Yoshiro Yamane, Akashi (JP); Masanori Kobayashi, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 10/411,858

(22) Filed: Apr. 11, 2003

(65) Prior Publication Data

US 2003/0192492 A1 Oct. 16, 2003

(30) Foreign Application Priority Data

Apr. 12, 2002 (JP) ........................................ 2002-109886

(51) Int. Cl.[7] .............................................. F02B 33/04
(52) U.S. Cl. ................................................. 123/73 PP
(58) Field of Search ........................... 123/73 F, 73 C, 123/73 PP, 65 S, 65 R, 58.5, 58.6

(56) References Cited

U.S. PATENT DOCUMENTS 4,481,909 A * 11/1984 Takada et al. .......... 123/73 CC
6,418,891 B2 * 7/2002 Kobayashi ............... 123/73 PP

FOREIGN PATENT DOCUMENTS

| GB | 2259549 A | * 3/1993 | ........... F02B/33/14 |
| JP | 57-45890 | 9/1992 | |
| JP | 05-118225 | 5/1993 | |

* cited by examiner

Primary Examiner—Mahmoud Gimie
Assistant Examiner—Hyder Ali

(57) ABSTRACT

A two-cycle combustion engine with a two-staged piston addresses a blow-off phenomenon of an air-fuel mixture. A cylinder block has a two-staged cylinder bore with a reduced diameter bore portion and a large diameter bore portion, and a two-staged piston having a reduced diameter piston portion and a large diameter piston portion. An annular auxiliary chamber is defined between the cylinder bore and the two-staged piston. An air passage introduces air mixed with oil into a crank chamber. An air-fuel mixture passage introduces the air-fuel mixture into the auxiliary chamber. A scavenge air passage supplies the air within the crank chamber into a combustion chamber, and an injection passage injects the air-fuel mixture within the auxiliary chamber into the combustion chamber from an inner peripheral surface of the cylinder block in a direction oriented substantially diagonally upwardly.

20 Claims, 7 Drawing Sheets

TWO-CYCLE COMBUSTION ENGINE HAVING TWO-STAGED PISTON

BACKGROUND OF THE INVENTION

1. Field of the Invention

The present invention generally relates to a two-cycle combustion engine of an air scavenging type suitable for use as a power plant for a compact rotary machine such as, for example, a brush cutter and, more particularly, to the two-cycle combustion engine of a kind wherein a two-staged piston is drivingly inserted in a correspondingly two-staged cylinder bore.

2. Description of the Related Art

The two-cycle combustion engine is generally of a design in which an air-fuel mixture introduced into a crank chamber is supplied into a combustion chamber to scavenge a combustion gas within the combustion chamber. Accordingly, the conventional two-cycle combustion engine is susceptible to a problem in that a portion of the air-fuel mixture supplied into the combustion chamber tends to flow outwardly through an exhaust port together with the combustion gas, that is, susceptible to a so-called blow-off phenomenon. In view of this, in order to avoid the blow-off phenomenon, attempts have been made to provide a two-cycle combustion engine in which a two-staged piston having small and large diameter piston portions is drivingly accommodated within a cylinder bore having small and large diameter bore portions.

More specifically, as the two-cycle combustion engine of the type discussed above, the Japanese Laid-open Patent Publication No. 5-118225 discloses the two-cycle combustion engine so designed and so configured that the air-fuel mixture introduced into a pump chamber defined between the large diameter bore portion of the two-staged cylinder bore in the cylinder block and the small diameter piston portion of the two-staged piston is fed under pressure into the combustion chamber from the pump chamber through a connecting passage during the ascending motion of the two-staged piston and that an intake valve for selectively opening or closing an intake port of the combustion chamber is opened at a timing at which an exhaust port is substantially closed by the small diameter piston portion of the two-staged piston then ascending to thereby prevent the air-fuel mixture, then introduced into the combustion chamber through the intake port, from flowing outwardly through the exhaust port.

Also, the Japanese Examined Patent Publication No. 57-45890 discloses the two-cycle combustion engine in which an injection nozzle is employed for injecting an air into the exhaust passage and an air is introduced into an auxiliary chamber defined between the large diameter bore portion of the two-staged cylinder bore and the small diameter piston portion of the two-staged piston, by opening a check valve during a descending motion of the two-staged piston and in which in synchronism with the last stage of the exhaust stroke during which the exhaust port is gradually closed as a result of the subsequent ascending motion of the two-staged piston, the air pressurized within the auxiliary chamber can be blown into the exhaust passage through the injection nozzle to thereby urge the air-fuel mixture, once discharged into the exhaust passage through the exhaust port, backwardly into the cylinder bore.

It has, however, been found that the first mentioned two-cycle combustion engine disclosed in the Japanese Laid-open Patent Publication No. 5-118225 has a problem in that it requires a mechanism for driving the intake valve for selectively opening or closing the intake port, through which the air-fuel mixture can be introduced into the combustion chamber, by means of a cam shaft or a crankshaft. In addition, the first mentioned two-cycle combustion engine requires a carburetor for supplying the air-fuel mixture into the pump chamber, an air cleaner for supplying an air into the crank chamber and the intake valve for selectively opening or closing the intake port through which the air-fuel mixture can be supplied from the pump chamber into the combustion chamber to be disposed having been spaced a distance from each other, resulting in complication in structure and increase in cost. Yet, since the air-fuel mixture is introduced into the combustion chamber during opening of the intake valve prior to the exhaust port being completely closed, it is not possible to completely eliminate the blow-off phenomenon of the air-fuel mixture.

On the other hand, the second mentioned two-cycle combustion engine disclosed in the Japanese Examined Patent Publication No. 57-45890 has a problem in that since the air-fuel mixture once discharged into the exhaust passage through the exhaust port is forced to return into the cylinder bore by the action of the air injected through the injection nozzle, the efficiency with which the blow-off phenomenon can be effectively prevented is low and, also, since a large amount of air and a high air pressure are necessary, the auxiliary chamber tends to increase in size. Also, since the timing at which the air under pressure is injected must be set to the last stage of the exhaust stroke, the exhaust port tends to be closed by the two-staged piston then ascending before the air-fuel mixture once entering the exhaust passage is urged backwardly into the cylinder bore and, therefore, the air-fuel mixture is no longer returned into the combustion chamber. For these reasons, even in this two-cycle combustion engine, the blow-off phenomenon of the air-fuel mixture cannot be avoided effectively.

SUMMARY OF THE INVENTION

In view of the foregoing, the present invention has been devised to provide an improved two-cycle combustion engine of a kind having a two-staged piston, which is simple in structure and inexpensive and in which the undesirable blow-off phenomenon of the air-fuel mixture can be avoided effectively.

In order to accomplish the foregoing object of the present invention, the two-cycle combustion engine herein disclosed is of a type including a cylinder block having a two-staged cylinder bore defined therein and having a reduced diameter bore portion and a large diameter bore portion, and a two-staged piston having a reduced diameter piston portion and a large diameter piston portion and drivingly accommodated within the two-staged cylinder bore. An annular auxiliary chamber is defined between the large diameter bore portion of the two-staged cylinder bore and the reduced diameter piston portion of the two-staged piston. The two-cycle combustion engine also includes an air passage for introducing an air into a crank chamber, an air-fuel mixture passage for introducing the air-fuel mixture into the auxiliary chamber, a scavenge air passage for supplying the air within the crank chamber into a combustion chamber, and an injection passage for injecting the air-fuel mixture within the auxiliary chamber into the combustion chamber from an inner peripheral surface of the cylinder block in a direction oriented substantially diagonally upwardly.

According to the present invention, with the two-cycle combustion engine so constructed as hereinabove described, when an exhaust inlet port provided in the cylinder bore is opened as the two-staged piston descends from the top dead center, a combustion gas within the combustion chamber can be discharged into an exhaust passage of the engine through the exhaust port. At the same time, the pressure inside the crank chamber increased as a result of a descending motion of the two-staged piston and, accordingly, the air compressed within the crank chamber can be injected into the combustion chamber of which pressure is then lowered through the scavenge air passage, thereby purging the combustion gas within the combustion chamber into the exhaust passage. During this scavenge stroke, a negative pressure is developed within the auxiliary chamber as a result of the descending motion of the two-staged piston and the air-fuel mixture can therefore be introduced into the auxiliary chamber through the air-fuel mixture passage. Accordingly, during the descend of the two-staged piston, not only can the combustion gas be scavenged off by the compressed air, but the air-fuel mixture will not be introduced into the combustion chamber, and therefore a blow-off phenomenon of the air-fuel mixture into the exhaust passage can advantageously be prevented. On the other hand, when the two-staged piston ascends subsequently, and at the timing at which the pressure within the auxiliary chamber increases to a predetermined value as a result of the ascending motion of the two-staged piston, the air-fuel mixture within the auxiliary chamber can be injected into the combustion chamber through the injection passage so as to flow substantially diagonally upwardly and, therefore, even when the air-fuel mixture is introduced into the combustion chamber prior to the exhaust port being closed, the exhaust port is closed before the air-fuel mixture reaches the exhaust port and, accordingly, blow-off of the air-fuel mixture into the exhaust passage can be prevented. Also, since mere provision of the injection passage through which the air-fuel mixture within the auxiliary chamber can be injected into the combustion chamber is sufficient, the inexpensive and compact structure can be obtained easily.

Preferably, the two-cycle combustion engine also includes a carburetor for preparing the air-fuel mixture by mixing an air, supplied through an air cleaner, with fuel. The carburetor has a portion of the air passage in addition to a portion of the air-fuel mixture passage, and a single valve for adjusting an opening of each of the air-fuel mixture passage and the air passage. According to this structural feature, unlike the structure such as that in the conventional two-cycle combustion engine in which the carburetor, the air cleaner and the intake valves are disposed independently and separately, both of the air-fuel mixture and the air can be supplied from the air cleaner by way of the carburetor and, moreover, since the respective openings of the air-fuel mixture passage and the air passage are adjusted by the single valve, the structure as a whole can be assembled compact in size.

Preferably, the two-cycle combustion engine furthermore includes a first check valve for selectively opening or closing the air passage, a second check valve for selectively opening or closing the air-fuel mixture passage, and a third check valve for selectively opening or closing the injection passage. According to this structural feature, since the air passage, the air-fuel mixture passage and the injection passage can be selectively opened or closed by the respective check valves each being of a simplified structure operable to permit the flow through the associated passage when the pressure within the associated passage increases to a value not lower than a predetermined value, the structure can advantageously be simplified, accompanied by reduction in cost as compared with the use of the complicated drive mechanism for selectively opening or closing by means of the cam shaft or the crankshaft employed in the conventional two-cycle combustion engine.

Preferably, the carburetor is fitted to the engine body through an insulator. All of the first to third check valves being fitted to the insulator. According to this structural feature, the intensive disposition of the first to third check valves in the insulator makes it possible to facilitate manufacture of the two-cycle combustion engine, accompanied by simplification of the structure and reduction in const.

Preferably, the two-cycle combustion engine furthermore includes a fourth check valve comprising a relief valve for relieving a pressure inside the injection passage which is not lower than a predetermined value and the pressure at which the relief valve opens is so chosen as to be higher than the pressure at which the third check valve opens. According to this feature, the air-fuel mixture within the injection passage can be continuously injected into the combustion chamber before the pressure at which the relief valve is opened is attained and, therefore, a required amount of fuel can be assuredly supplied to the combustion chamber. Also, when the pressure of the air-fuel mixture within the injection passage increases as a result of the ascending motion of the two-staged piston after an outlet of the injection passage has been closed by the two-staged piston, the air-fuel mixture can be discharged through the relief valve when the pressure of the air-fuel mixture within the injection passage increases to a value equal to the pressure at which the relief valve is opened. Therefore, the possibility can be avoided that the pressure within the injection passage may create a large resistance during the ascending motion of the two-staged piston.

Preferably, the direction in which the air-fuel mixture is injected from the injection passage is oriented towards an ignition plug. According to this structural feature, even though the compressed air for scavenging the combustion gas is somewhat excessively supplied into the combustion chamber through the scavenge air passage and drifts in the vicinity of the ignition plug, injection of the air-fuel mixture in a direction confronting the ignition plug allows the air-fuel mixture to be easily fired by the ignition plug.

Preferably, the two-cycle combustion engine includes a recovery passage extending through the insulator for recovering the air-fuel mixture from the relief valve to a fuel tank. According to this structural feature, since the insulator can be cooled by the air-fuel mixture flowing through the recovery passage, the cylinder block and the carburetor can advantageously insulated thermally from each other.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, preferred embodiments of the present invention will be described in detail with reference to the accompanying drawings.

Figure 1:
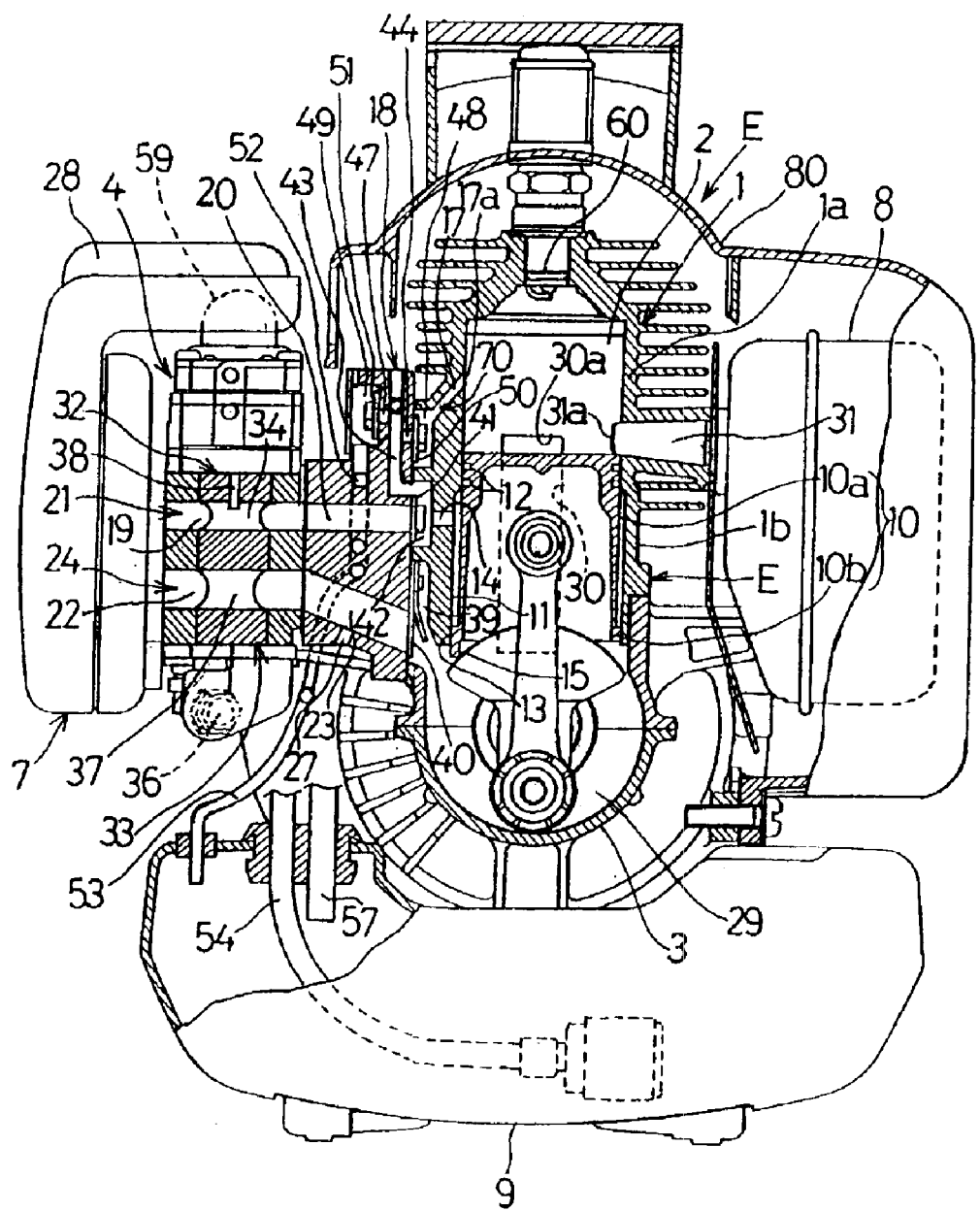
FIG. 1 is a front elevational view, with a portion broken away, of a two-cycle combustion engine according to a first preferred embodiment of the present invention, showing a staged piston arriving at the bottom dead center.

FIG. 1 illustrates a two-cycle combustion engine having a staged piston used therein in accordance with a first preferred embodiment of the present invention, which engine is shown in a front elevational representation with a portion broken away to show the staged piston arriving at the bottom dead center. The two-cycle combustion engine shown therein is shown as used with a brush cutter by way of example. An engine body E of the two-cycle combustion engine includes a cylinder block 1 having a combustion chamber 2 defined therein and fixedly mounted on a separate crankcase 3. A carburetor 4 and an air cleaner 7 forming an intake system are connected to a left-hand portion of the wall of the cylinder block 1 and a muffler 8 forming a part of an exhaust system is connected to a right-hand portion of the wall of the cylinder block 1. A fuel tank 9 is fitted to a bottom of the crankcase 3. The cylinder block 1 and the muffler 8 are covered by a shroud 80 for heat and noise insulation and also for guiding a cooling air.

The cylinder block 1 has a cylinder bore stepped in two stages, including an upper bore portion 1a of a reduced inner diameter and a lower bore portion 1b of a large inner diameter coaxial with the upper bore portion 1a. A piston 10 accommodated within the cylinder bore of the cylinder block 1 is correspondingly stepped in two stages, including an upper piston portion 10a of a reduced outer diameter and a lower piston portion 10b of a large outer diameter coaxial with the upper piston portion 10a. Accordingly, the two-staged piston 10 is accommodated within the two-staged cylinder bore with the upper and lower piston portions 10a and 10b slidably inserted in the upper and lower bore portion 1a and 1b of the cylinder block 1, respectively. This two-staged piston 10 is coupled with a crankshaft 72 through a connecting rod 71. An annular auxiliary chamber 11 is defined between the lower bore portion 1b of the two-staged cylinder block 1 and the upper piston portion 10a of the two-staged piston 10. Also, a piston ring 12 is mounted on an outer periphery of the upper piston portion 10a of the two-staged piston 10 at a location adjacent an upper end portion thereof and is slidingly and sealingly held in contact with an inner peripheral surface of the upper bore portion 1a of the two-staged cylinder bore in the cylinder block 1. On the other hand, a circumferentially extending groove 13 is defined on an outer peripheral surface of the lower piston portion 10b of the two-staged piston 10 at a location adjacent a lower end portion thereof to define a labyrinth seal structure between it and the lower bore portion 1b of the two-staged cylinder bore in the cylinder block 1.

It is, however, to be noted that in place of the circumferentially extending groove 13, a piston ring may be used and mounted on the upper peripheral surface of the lower piston portion 10b of the two-staged piston 10.

The cylinder block 1 is formed with an air-fuel mixture inlet port 14 for introducing an air-fuel mixture, which is prepared in the carburetor 4 by mixing a fuel with an air, into the annular auxiliary chamber 11, and a injection guide path 17 having its opposite open ends in communication with the auxiliary and combustion chambers 11 and 2, respectively, for injecting the air-fuel mixture from the auxiliary chamber 12 into the combustion chamber 2 in a direction generally diagonally upwardly and, specifically, towards an ignition plug 60. The carburetor 4 is mounted on the cylinder block 1 of the engine body E through an insulator 18 made of a synthetic resin. This carburetor 4 and the insulator 18 have defined therein respective air-fuel mixture supply ports 19 and 20 that are communicated with the air-fuel mixture inlet port 14 in the cylinder block 1. Those air-fuel mixture supply ports 19 and 20 and the air-fuel mixture inlet port 14 altogether define an air-fuel mixture passage 21. Also, the carburetor 4 and the insulator 18 have air supply and inlet ports 22 and 23 defined therein, respectively, and those ports 22 and 23 altogether define an air passage 24 for introducing an air, introduced through the air cleaner 7, into a crank chamber 29 defined within the crankcase 3.

Figure 4:
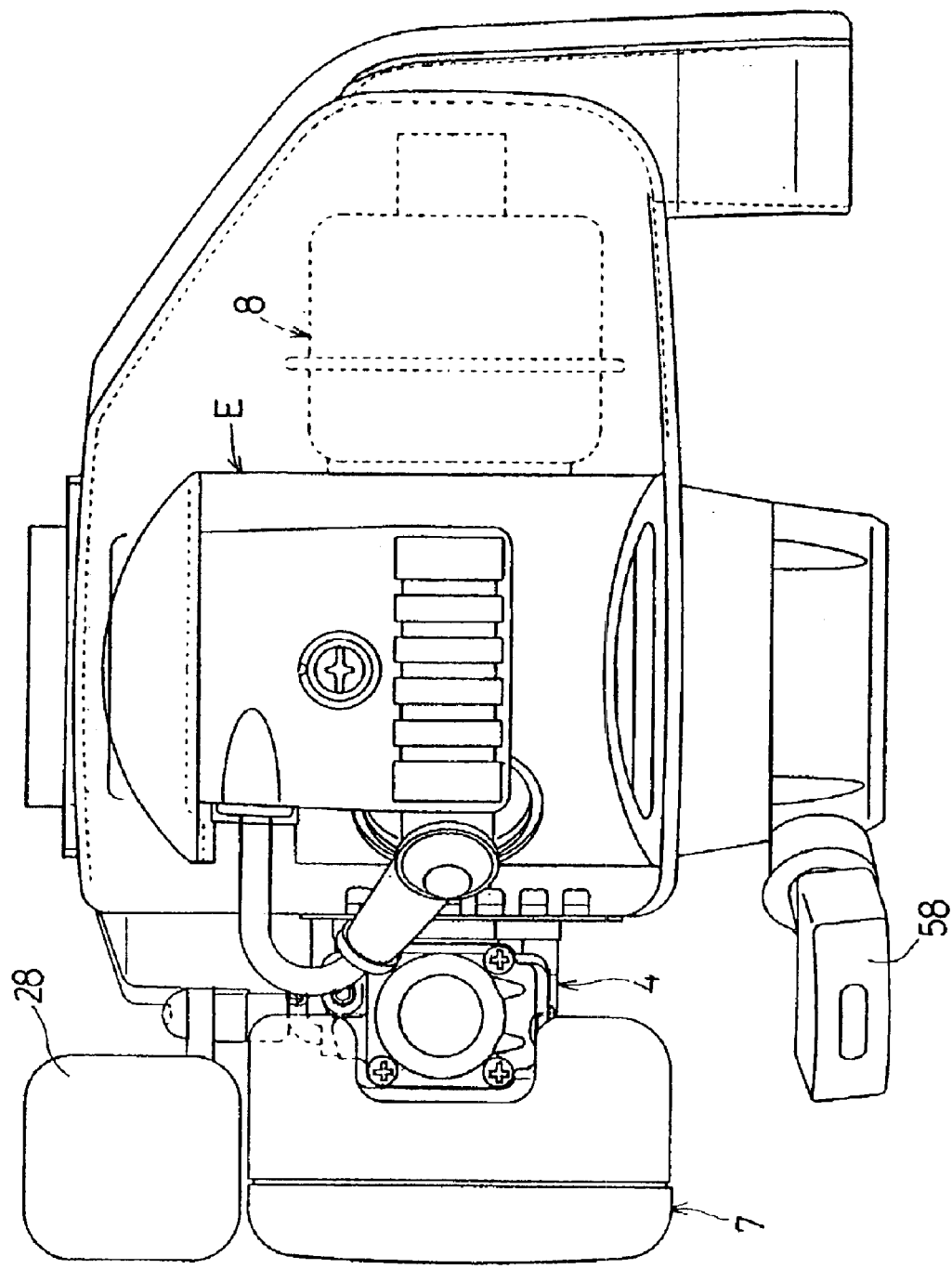
FIG. 4 is a top plan view of the two-cycle combustion engine of FIG. 1.

The air inlet port 23 defined in the insulator 18 is communicated with an oil supply port 27 to which an oil contained in an oil tank 28 disposed rearwardly of the air cleaner 7 as shown in FIG. 4 in a top plan view of the combustion engine can be supplied by means of an oil pump (not shown). Accordingly, the crank chamber 29 (FIG. 1) is supplied with an air mixed with the oil. Attention is called that a recoil starter 58 is mounted on a front surface of the crankcase 3 (FIG. 4).

The cylinder block 1 is also formed with a scavenge air passage 30 defined therein so as to open into the cylinder bore for supplying the air, introduced into the crank chamber 29, into the combustion chamber 2. In addition, the cylinder block 1 is formed with an exhaust passage 31 defined therein so as to communicate with the muffler 8. This exhaust passage 31 has an exhaust inlet port 31a having its upper edge positioned at a level slightly higher than an upper edge of each of a scavenge outlet port 30a of the scavenge air passage 30. The injection guide path 17 has an injection port 17a opening into the cylinder bore in the cylinder block 1, which is positioned at a level higher than the scavenge outlet port 30a. The injection port 17a and the exhaust port 31a are spaced substantially 180° from each other about a longitudinal axis of the cylinder block 1 and the two scavenge outlet ports 30a are spaced substantially 90° from the injection port 17a and the exhaust port 31a, respectively, about the longitudinal axis of the cylinder block 1.

The carburetor 4 is provided with a single rotary valve 32 for simultaneously controlling the supply of the air-fuel mixture flowing through the air-fuel mixture supply port 19 and the supply of the air flowing through the air supply port 22, respectively. This rotary valve 32 includes a cylindrical valve body 33 having its upper portion formed with an intake port 34, forming a part of the air-fuel mixture supply port 19, SO as to extend radially therethrough and also has its lower portion formed with an air port 37, forming a part of the air supply port 22, so as to extend radially therethrough and is mounted on a casing of the carburetor 4 for rotation about an axis extending vertically of the carburetor casing. The intake port 34 is provided with a main nozzle 38 through which the fuel can be injected into the intake port 34. The rotary valve 32 is, during the engine body E being operated, driven by a rotary mechanism 36, mounted on the carburetor 4, for adjusting respective openings, that is, respective passage areas of the intake port 34 and the air port 37 relative to the air-fuel mixture passage 21 and the air passage 24 to thereby simultaneously adjust and control the respective amounts of the air-fuel mixture and air to be introduced from the passages 21 and 24 towards the auxiliary chamber 11 and the crank chamber 29.

The insulator 18 referred to above has fitted thereto a first check valve 40 for selectively opening or closing the air inlet port 23 of the air passage 24 and a second check valve 41 for selectively opening or closing the air-fuel mixture supply port 20 of the air-fuel mixture passage 21. Each of those check valves 40 and 41 is employed in the form of a reed valve. The first check valve 40 is disposed within a first valve chamber 39 provided on an outer peripheral portion of the cylinder block 1 and is operable to allow the air mixed with the oil to flow in a downstream direction, that is, into the crank chamber 29, but to inhibit the flow of such air in an upstream direction. The second check valve 41 is operable to allow the air-fuel mixture to flow in a downstream direction, that is, into the auxiliary chamber 11 through a second valve chamber 42, defined between the insulator 18 and the cylinder block 1, and also through the air-fuel mixture inlet port 14, but to inhibit the flow of such air-fuel mixture in an upstream direction.

Also, the insulator 18 is provided with a connecting passage 43 communicated with the second valve chamber 42, and introduction and discharge ports 44 and 47 branched off from the connecting passage 43 and communicated respectively with third and fourth valve chambers 48 and 49. The connecting passage 43, the introduction port 44, the second valve chamber 42 and the third valve chamber 48 cooperate with the injection guide path 17 to define a injection passage 70 through which the air-fuel mixture can be injected into the combustion chamber 2. The third valve chamber 48 provided in this injection passage 70 has a third check valve 50 disposed therein and employed in the form of a reed valve for selectively opening or closing the injection passage 70. This third check valve 50 is operable to allow the air-fuel mixture, supplied through the connecting passage 43 and the introduction port 44, to flow in a downstream direction, that is, into the combustion chamber 2 through the injection guide path 17, but to inhibit the flow of the air-fuel mixture in an upstream direction.

A fourth check valve 51 in the form of a reed valve for selectively opening or closing the discharge port 47 is provide in the fourth valve chamber 49. The pressure at which this fourth check valve 51 opens is so set to a value higher than the pressure at which the third check valve 50 opens. In other words, this fourth check valve 51 serves as a relief valve and is operable to open when the pressure of the air-fuel mixture within the injection passage 70 is not lower than a predetermined value, to thereby discharge the air-fuel mixture from the discharge port 47 into the fourth valve chamber 49, resulting in relief of the pressure which is not lower than the predetermined value. The insulator 18 is formed with a recovery passage 52 for recovering the air-fuel mixture, discharged into the fourth valve chamber 49 in the manner described above, into the fuel tank 9. This recovery passage 52 extends within the insulator 18 from the fourth valve chamber 49, positioned in an upper portion of the insulator 18, to a position adjacent a lower portion of the insulator 18, bypassing the air-fuel mixture supply port 20 and the air inlet port 23 and has its lower outlet communicated with the fuel tank 9 through a fuel recovery tube 53.

It is to be noted that the fuel within the fuel tank 9 is supplied to the carburetor 4 through a fuel supply tube 54 communicated with a fuel supply port (not shown) of the carburetor 4. Also, when a manually operable member 59 of a circulating pump (not shown) is pressed before the start of the combustion engine, the fuel within the fuel tank 9 can be sucked into the carburetor 4 through the fuel supply tube 54 while a surplus of the fuel can be circulated back to the fuel tank 9 from a fuel discharge port (not shown) of the carburetor 4 through a fuel return tube 57.

Hereinafter, the operation of the two-cycle combustion engine of the structure described above will be discussed.

When the two-staged piston 10 descends towards the bottom dead center as shown in FIG. 1, a negative pressure is developed within the auxiliary chamber 11 and, therefore, the second check valve 41 opens to allow the air-fuel mixture from the carburetor 4 to be introduced into the auxiliary chamber 11 through the air-fuel mixture passage 21 including the air-fuel mixture supply ports 19 and 20 and the air-fuel mixture inlet port 14.

During this descend stroke of the two-staged piston 10, the exhaust inlet port 31a opens first to allow combustion gases within the combustion chamber 2 to be discharged into the exhaust passage 31. On the other hand, since the pressure within the crank chamber 29 increased as a result of the descend of the two-staged piston 10, the first check valve 40 is kept in a closed position. When the scavenge outlet port 30a is subsequently opened, the air introduced into the crank chamber 29 together with the oil is released into the combustion chamber 2 through the scavenge air passage 30 by way of the scavenge outlet port 30a to purge the exhaust gas towards the exhaust inlet port 31a. In other words, scavenging of the combustion gases is accelerated by an air supplied under pressure from the crank chamber 29 and, since at this time no air-fuel mixture is not introduced into the combustion chamber 2, no blow-off phenomenon of the air-fuel mixture occur.

The air-fuel mixture introduced into the auxiliary chamber 11 is supplied into the connecting passage 43 from the air-fuel mixture inlet port 14 through the second valve chamber 42 as the volume of the auxiliary chamber 11 decreases as a result of the two-staged piston 10 ascending from the bottom dead center, and is compressed before the pressure thereof attains a value at which the third check valve 50 opens. When the pressure of the air-fuel mixture within the connecting passage 43 thus reaches a value higher than the pressure at which the third check valve 50 opens, the third check valve 50 opens to allow the air-fuel mixture within the connecting passage 43 to be jetted into the combustion chamber 2 through the introduction port 44, the third valve chamber 48 and finally through the injection guide path 17. Since this air-fuel mixture is jetted into the combustion chamber 2 in a direction diagonally upwardly, the possibility can be avoided that the air-fuel mixture may be directly blown off into the exhaust passage 31 from the exhaust inlet port 31a that opens in the combustion chamber 2 on a side opposite to and at a position lower than the injection port 17.

Also, in this two-cycle combustion engine, the pressure at which the third check valve 50 opens is so designed and so chosen that the air-fuel mixture can be jetted into the combustion chamber 2 at a timing coinciding with the last stage of an exhaust stroke at which time the exhaust inlet port 31a can be substantially closed by the two-staged piston 10. Accordingly, the blow-off phenomenon of the air-fuel mixture can be effectively avoided and, therefore, an undesirable increase of unburned HC component of the exhaust gases can advantageously be prevented.

Figure 2:
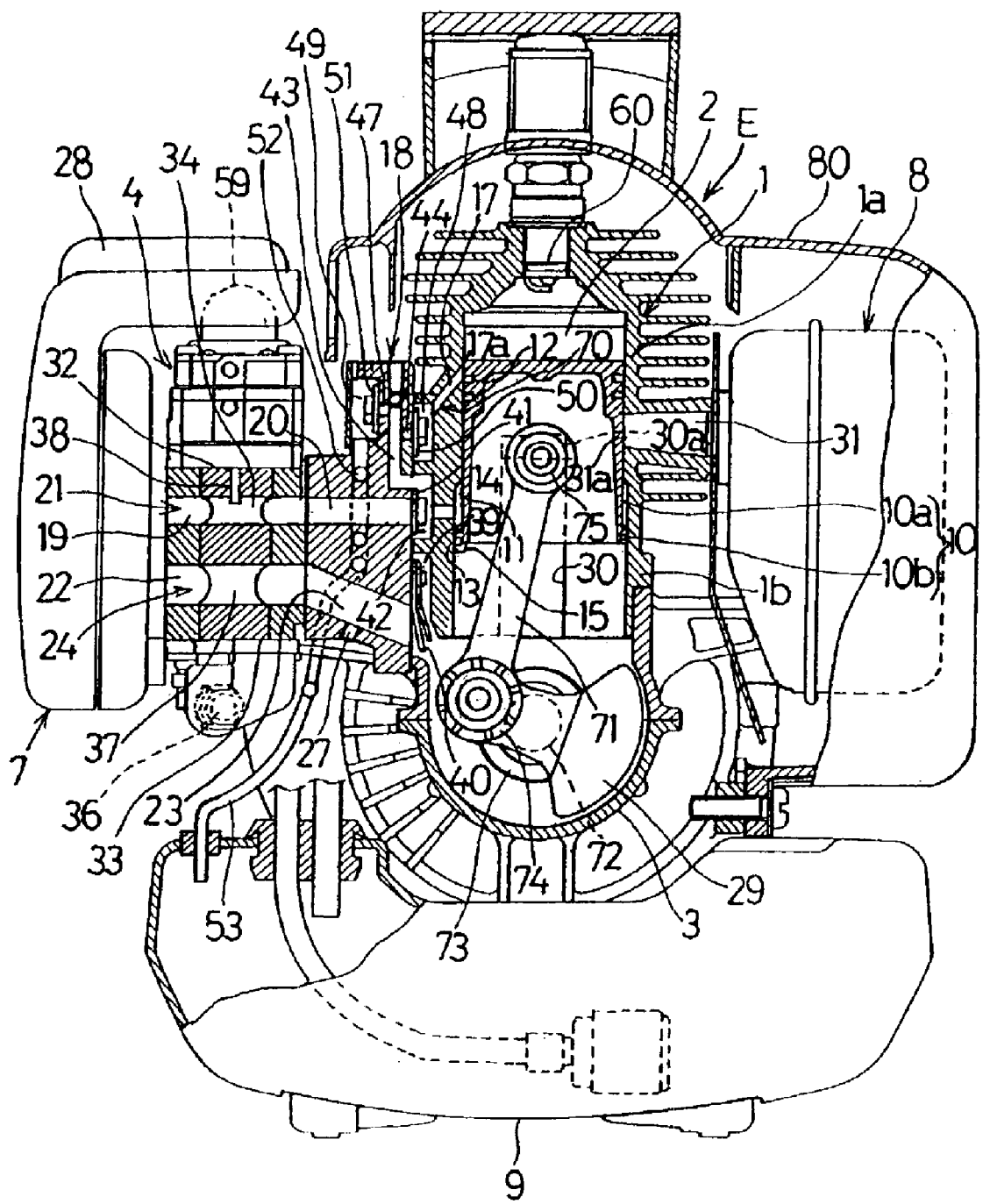
FIG. 2 is a front elevational view, with a portion broken away, of the two-cycle combustion engine of FIG. 1, showing the staged piston ready to arrive at the top dead center.

In the event that the two-staged piston 10 ascends to a position shown in FIG. 2, the injection port 17a is closed by the two-staged piston 10 and as the two-stage piston 10 further ascends from the position shown in FIG. 2, the pressure of the air-fuel mixture within the connecting passage 43 abruptly increased to exceed the pressure at which the fourth check valve 51 opens. As a result thereof, the fourth check valve 51 opens to allow the air-fuel mixture within the connecting passage 43 to be recovered into the fuel tank 9 through the exhaust port 47 by way of the fourth valve chamber 49, then the recovery passage 52 in the insulator 18 and finally the fuel recovery tube 53. The insulator 18, when cooled by the air-fuel mixture flowing within the recovery passage 52, exhibits an increased effect of thermally insulating the carburetor 4 from the engine body E, resulting in stabilization of the performance of the carburetor 4. Also, since during the ascend stroke as described above, the pressure of the air-fuel mixture within the connecting passage 43, which is not lower than the predetermined value is relieved by opening the fourth check valve 51, the pressure of the air-fuel mixture within the injection passage 70, that is, the pressure inside the auxiliary chamber 11 will not pose a large resistance during the ascend of the two-staged piston 10.

On the other hand, since as a result of ascend of the two-staged piston 10 the negative pressure is developed inside the crank chamber 29, the first check valve 40 opens to allow the air mixed with the oil to be introduced into the crank chamber 29 from the air passage 24. The oil so introduced into the crank chamber 29 is used to lubricate bearings 73 for the crankshaft 72, respective bearings 74 and 75 for large and small diameter ends of the connecting rod 71 and an outer peripheral surface of the two-staged piston 10.

Figure 3:
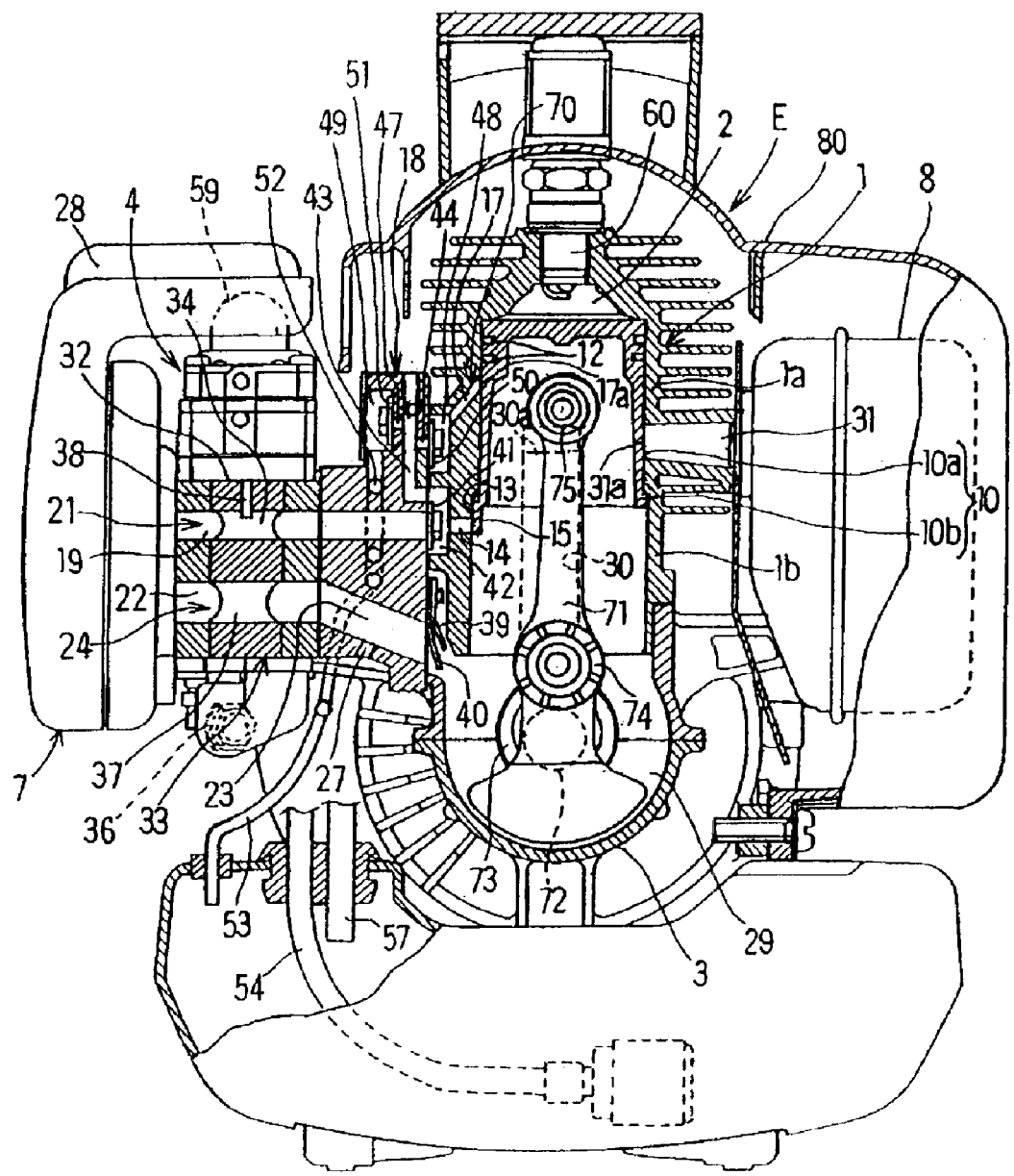
FIG. 3 is a front elevational view, with a portion broken away, of the two-cycle combustion engine of FIG. 1, showing the staged piston arriving at the top dead center.

As the two-staged piston 10 continues ascending from a position shown in FIG. 2, the air-fuel mixture within the combustion chamber 2 is compressed. When this two-staged piston 10 nears the top dead center as shown in FIG. 3, the air-fuel mixture so compressed within the combustion chamber 2 is fired by the ignition plug 60 to explode, causing the two-staged piston 10 to start its descending motion. It is to be noted that the air-fuel mixture is so oriented as to be injected from the injection port 17a in a direction confronting the ignition plug 60. Accordingly, even though the compressed air for scavenging is somewhat excessively supplied from the scavenge air passage 30 into the combustion chamber 2 and drifts in the vicinity of the ignition plug 60, the air-fuel mixture can be jetted towards the ignition plug 60 and, therefore, the air-fuel mixture mixed with the somewhat excessive air in the vicinity of the ignition plug 60 can easily be fired by the ignition plug 60. It is, however to be noted that when the two-staged piston 10 reaches the top dead center as shown in FIG. 3, a stop piece 15 formed in the two-staged piston 10 so as to extend downwardly from a lower end thereof closes the air-fuel mixture inlet port 14 to avoid any possible leakage of the fuel-air mixture towards a position downwardly of the two-staged piston 10.

As hereinabove described, with the two-cycle combustion engine according to the first embodiment of the present invention, since the blow-off phenomenon of the air-fuel mixture which would otherwise occur during each of the compression stroke, in which the two-staged piston 10 ascends, and the scavenge stroke in which the two-staged piston 10 descends can advantageously be avoided, fuel consumption is low. Also, in addition to the effect of reducing the concentration of the HC exhaust gas, the following advantages can also be appreciated. Specifically, the carburetor 4 includes, in addition to the air-fuel mixture supply port 19 forming a part of the air-fuel mixture passage 21, the air supply port 22 forming a part of the air passage 24 and, on the other hand, the respective openings of the intake port 34 and the air port 37 relative to the air-fuel mixture passage 21 and the air passage 24 can be adjusted as the single rotary valve 32 is rotated during the operation of the combustion engine so that the amounts of the air-fuel mixture and the air to be supplied, respectively, can be simultaneously adjusted and controlled. Because of these reasons, unlike the conventional two-cycle combustion engine in which the carburetor, the air cleaner and the intake valve are independently and separately disposed, the two-cycle combustion engine embodying the present invention can advantageously be compactized in its entirety.

Also, with the two-cycle combustion engine embodying the present invention, the air passage 24, the air-fuel mixture passage 21 and the injection passage 70 are controlled as to their opening by the simple check valves 40, 41 and 50, respectively, each operable to allow the flow therethrough only when the pressure exceeds a predetermined value, and those check valves 40, 41 and 50 are intensively provided in the insulator 18. Therefore, as compared with the use of the intake valve of a structure complicated enough to be selectively opened or closed by a cam shaft or a crankshaft employed in the conventional two-cycle combustion engine, the structure can advantageously be simplified, resulting in reduction in cost. In addition, since the insulator 18 can be cooled by allowing the air-fuel mixture, which is discharged to relieve the pressure within the injection passage 70 having the predetermined pressure, which to flow through the recovery passage 52, the function of thermally insulating the carburetor 4 from the engine body E can advantageously be enhanced.

Figure 5:
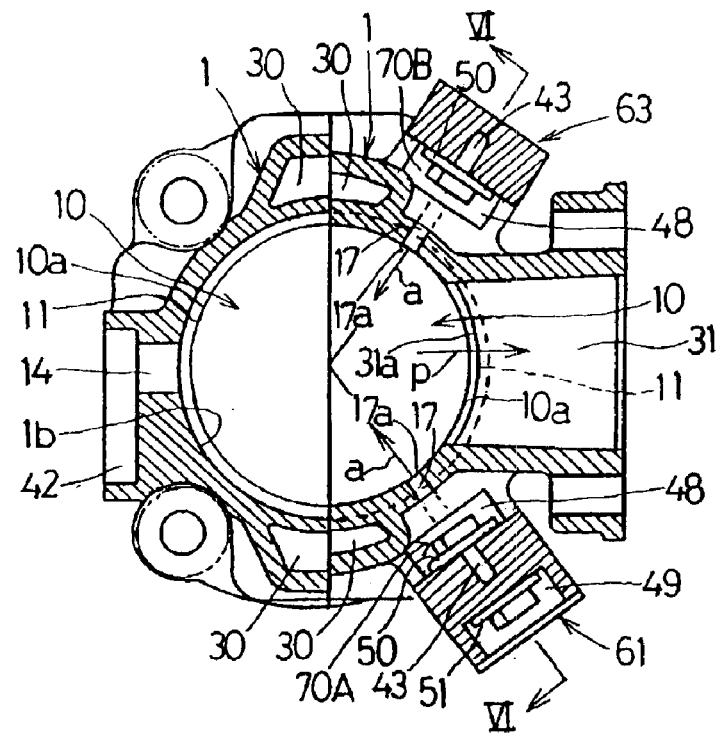
FIG. 5 is a transverse sectional view of the two-cycle combustion engine having the staged piston according to a second preferred embodiment of the present invention, with the combustion engine shown as cut out at two different portions.
Figure 6:
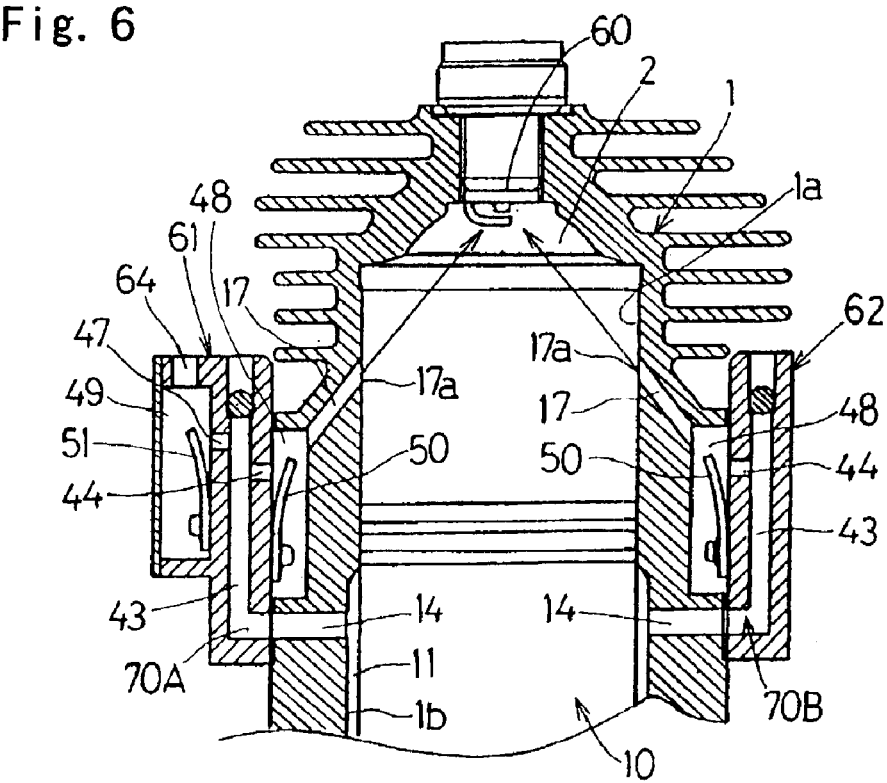
FIG. 6 is a cross-sectional view taken along the line VI—VI in FIG. 5.

FIG. 5 illustrates the two-cycle combustion engine having the two-staged piston according to a second preferred embodiment of the present invention, shown in a transverse sectional view with the combustion engine cut out at two different portions. FIG. 6 illustrates a cross-sectional view taken along the line VI—VI in FIG. 5. Referring to FIGS. 5 and 6, component parts alike those shown in FIGS. 1 to 3 are shown by like reference numerals and, the details thereof are not reinstated for the sake of brevity.

As shown in FIG. 5, the use is made of two injection passages 70A and 70B in communication with the auxiliary chamber 11. Specifically, the two injection passages 70A and 70B are positioned in the vicinity of and on respective sides of the exhaust passage 31 so as to sandwich the exhaust passage 31. In other words, in the vicinity of and on respective sides of the exhaust passage 31 in the cylinder block 1, air-fuel mixture inlet ports 14 communicated with the auxiliary chamber 11 is defined and, at a position corresponding to the air-fuel mixture inlet ports 14, passage forming members 61 and 62 are secured to the cylinder block 1. Each of the passage forming members 61 and 62 is formed with a connecting passage 43 and an introduction port 44 to define a third valve chamber 48 between it and the cylinder block 1.

Also, one of the passage forming members, that is, the passage forming member 61 is formed with a discharge port 47, a fourth valve chamber 49 and a discharge port 64 and a fourth check valve 51 is provided in the fourth valve chamber 49. The air-fuel mixture discharged into the fourth valve chamber 49 as a result of opening of the fourth check valve 51 can be directly recovered into the fuel tank 9, shown in FIGS. 1 to 3, from the discharge port 64 of the fourth valve chamber 49 shown in FIG. 6 by way of a fuel recovery tube (not shown). The air-fuel mixture emerging outwardly from each of the injection ports 17a is directed towards the ignition plug 60 and, accordingly, as can readily be understood from FIG. 5, the direction in which the air-fuel mixture jetted from the respective injection ports 17a has a direction component reverse to the direction of flow P of the combustion gases flowing outwardly through the exhaust passage 31.

According to the second embodiment shown in and described with reference to FIGS. 5 and 6, since the air-fuel mixture can be injected in a direction away from the discharge port 31a of the exhaust passage 31, the blow-off phenomenon of the air-fuel mixture can advantageously prevented even where in order to increase the charge efficiency arrangement is so made that the air-fuel mixture can be injected into the combustion chamber 22 before the exhaust port 31a is closed by the two-stepped piston 10 then ascending. Also, since as is the case with the previously described first embodiment, the air-fuel mixture emerging outwardly from the injection ports 17a are both directed towards the ignition plug 60, even though the compressed air for scavenging the combustion gas is somewhat excessively supplied into the combustion chamber 2 and drifts in the vicinity of the ignition plug 60, the air-fuel mixture can be jetted towards the ignition plug 60 and, therefore, the air-fuel mixture mixed with the somewhat excessive air in the vicinity of the ignition plug 60 can easily be fired by the ignition plug 60.

It is to be noted that although in the second embodiment of the present invention the two injection passages 70A and 70B have been employed, the number of the injection passages may not be always limited to two such as shown and described and only one or more injection passage may be employed within the broad aspect of the present invention.

Figure 7:
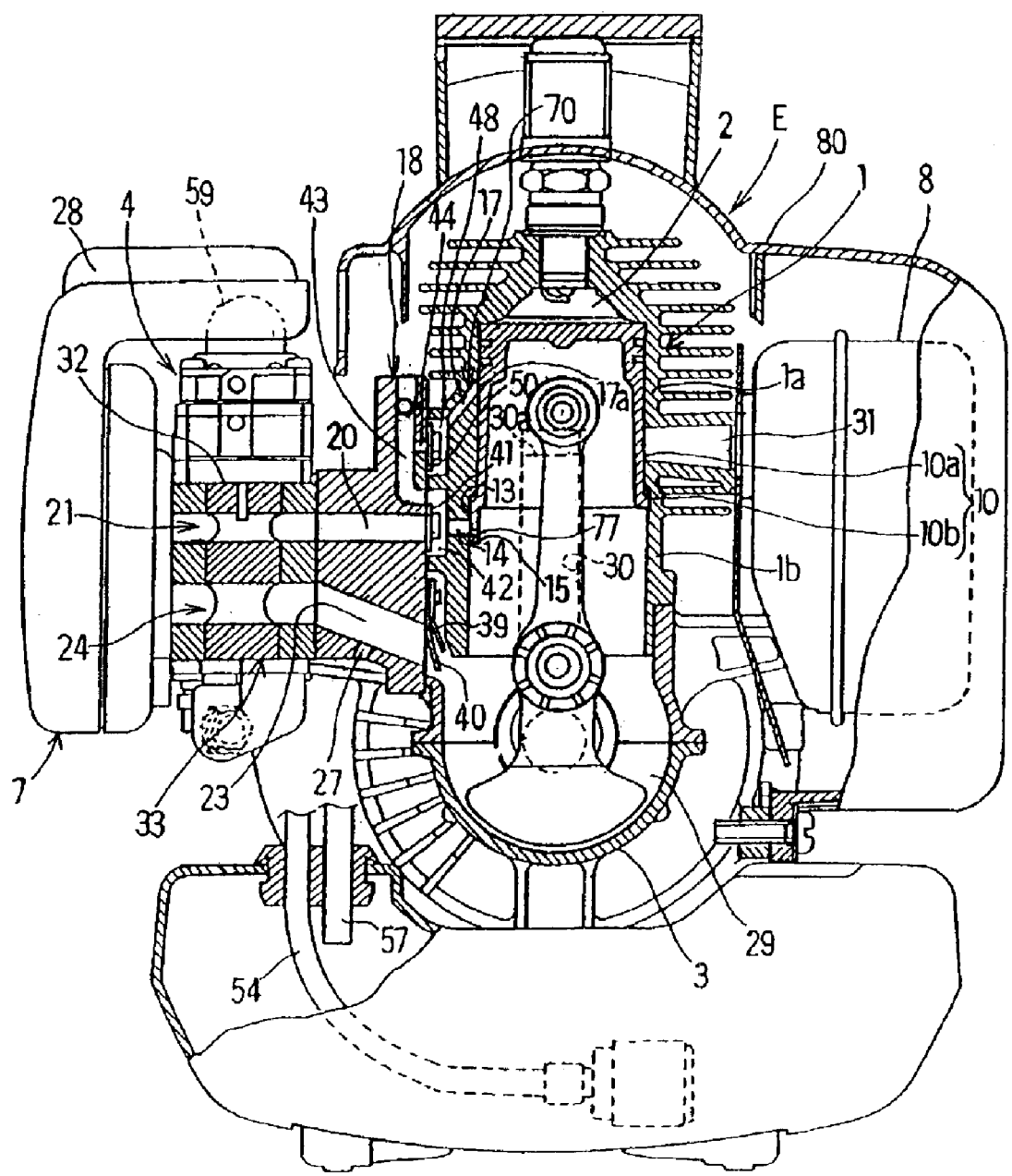
FIG. 7 is a front elevational view, with a portion broken away, of the two-cycle combustion engine according to a third preferred embodiment of the present invention.

FIG. 7 illustrates a third preferred embodiment of the present invention. In this third embodiment, the structure necessary to relieve the pressure inside the connecting passage 43 communicated with the second valve chamber 42 to which the air-fuel mixture is supplied differs from that employed in any one of the first and second embodiments. More specifically, in any one of the first and second embodiments shown in and described with reference to FIGS. 1 to 3 and FIGS. 5 and 6, respectively, when the injection port 17a shown in FIG. 2 is closed as a result of the ascend of the two-staged piston 10 with the pressure of the air-fuel mixture inside the connecting passage 43 consequently increased, the fourth check valve 51 opens to allow the air-fuel mixture to be recovered into the fuel tank 9 through the fourth valve chamber 49, then the recovery passage 52 and finally the fuel recovery tube 53 to thereby relieve a high pressure inside the connecting passage 43. In contrast thereto, in the third embodiment of the present invention, the high pressure inside the connecting passage 43 is relieved into the crank chamber 29.

Figure 8:
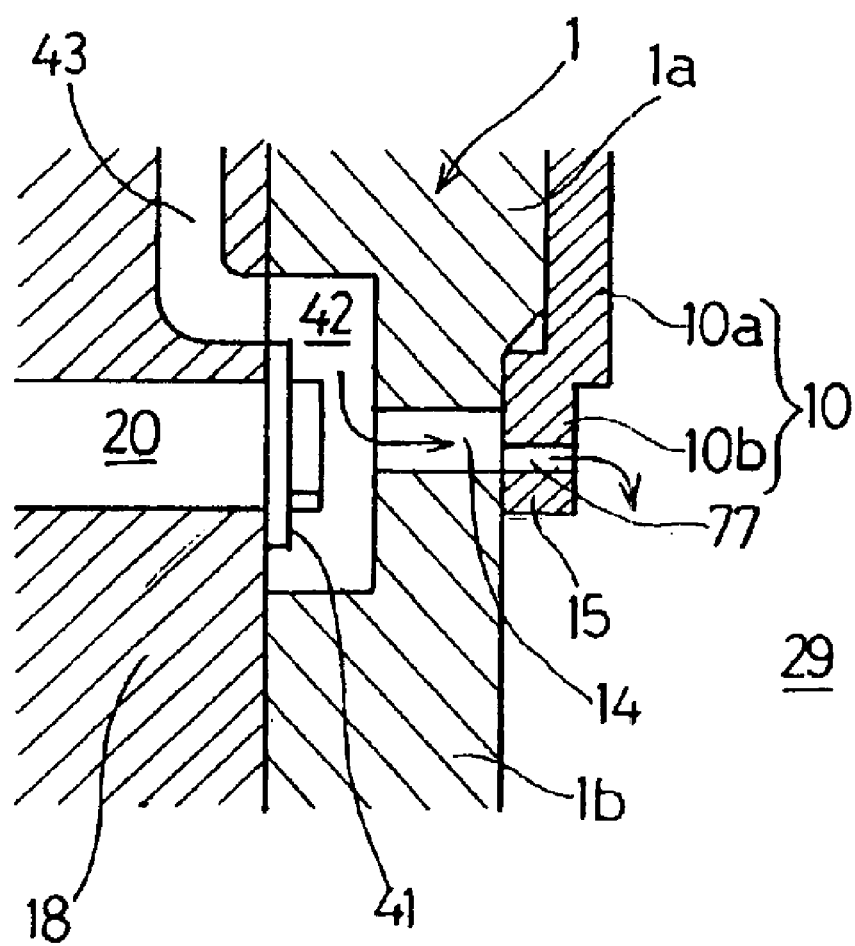
FIG. 8 is a fragmentary longitudinal sectional view showing a portion of the combustion engine of FIG. 7 adjacent a relief port defined therein.

For this relief structure, as shown in FIG. 8, a relief port 77 is defined in the lower piston portion 10b of the two-staged piston 10, for example, a lower end of the lower piston portion 10b so far shown in FIG. 8, so as to extend therethrough so that the relief port 77 can be communicated with the air-fuel mixture inlet port 14 when the two-staged piston 10 comes to a position encompassed within the range between the position, at which the two-staged piston 10 closes the injection port 17a, and the top dead center. In the illustrated example, when the two-staged piston 10 is held within the range from the position, where the two-staged piston 10 then ascending somewhat after it has closed the injection port 17a nears the top dead center, and the top dead center, the relief port 77 is communicated with the air-fuel mixture inlet port 14. Accordingly, even when the injection port 17a is closed by the two-staged piston 10 shown in FIG. 7 during the ascending motion of the two-staged piston 10, the air-fuel mixture within the second valve chamber 42 and the connecting passage 43 can be injected into the crank chamber 29 through the relief port 77 to thereby suppress an increase of the pressure inside the connecting passage 343, so that the possibility can be avoided that a high pressure if any within the connecting passage 43 and, hence, within the auxiliary chamber 11 will undesirably create a large resistance to the ascending motion of the two-staged piston 10.

Although it may occur that since the, air-fuel mixture entering the crank chamber 29 through the relief port 77 can be supplied into the combustion chamber 2 through the scavenge air passage 30 at an early timing, it may be blown off into the exhaust passage 31, the amount of the air-fuel mixture so blown off is so slight that the concentration of the exhaust gases will not get worse so much. This relief port 77 has a bore size which may be, for example, ½ or smaller than that of the air-fuel mixture inlet port 14, but may be suitably chosen to a size effective to allow the concentration of the exhaust gases to fall within a predetermined range.

Also, where as the fuel employed a mixed fuel containing gasoline and oil is used, the air-fuel mixture entering the crank chamber 29 through the relief port 77 can provide a lubrication and, therefore, the use of an oil pump for supplying an oil to the air passage 24 can advantageously be dispensed with.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A two-cycle combustion engine which comprises:
   a cylinder block having a two-staged cylinder bore defined therein, said two-staged cylinder bore having a reduced diameter bore portion and a large diameter bore portion;
   a two-staged piston having a reduced diameter piston portion and a large diameter piston portion and drivingly accommodated within the two-staged cylinder bore;
   an annular auxiliary chamber defined between the large diameter bore portion of the two-staged cylinder bore and the reduced diameter piston portion of the two-staged piston;
   an air passage for introducing air into a crank chamber;
   an air-fuel mixture passage for introducing the air-fuel mixture into the auxiliary chamber;
   a scavenge air passage for supplying the air within the crank chamber into a combustion chamber;

an injection passage for injecting the air-fuel mixture within the auxiliary chamber into the combustion chamber from an inner peripheral surface of the cylinder block in a direction oriented substantially diagonally upwardly;

a first check valve for selectively opening or closing the air passage;

a second check valve for selectively opening or closing the air-fuel mixture passage; and a third check valve for selectively opening or closing the injection passage, wherein the injection passage includes an injection port opening into the cylinder bore and positioned at a level higher than an exhaust port opening into the cylinder bore.

2. The two-cycle combustion engine as claimed in claim 1, further comprising a carburetor for preparing the air-fuel mixture by mixing air, supplied through an air cleaner, with fuel, said carburetor having a portion of the air passage in addition to a portion of the air-fuel mixture passage, and a single valve for adjusting an opening of each of the air-fuel mixture passage and the air passage.

3. The two-cycle combustion engine as claimed in claim 2, wherein the carburetor is fitted to an engine body through an insulator, all of said first to third check valves being fitted to the insulator.

4. The two-cycle combustion engine as claimed in claim 2, wherein the carburetor is fitted to an engine body through an insulator, and further comprising a relief valve for relieving a pressure inside the injection passage which is not lower than a predetermined value, and further comprising a recovery passage extending through the insulator for recovering the air-fuel mixture from the relief valve to a fuel tank.

5. The two-cycle combustion engine as claimed in claim 3, further comprising a fourth check valve comprising a relief valve for relieving a pressure inside the injection passage which is not lower than a predetermined value, the pressure at which the relief valve opens being so chosen as to be higher than the pressure at which the third check valve opens.

6. The two-cycle combustion engine as claimed in claim 1, further comprising a fourth check valve comprising a relief valve for relieving a pressure inside the injection passage which is not lower than a predetermined value, the pressure at which the relief valve opens being so chosen as to be higher than the pressure at which the third check valve opens.

7. The two-cycle combustion engine as claimed in claim 1, wherein a direction in which the air-fuel mixture is injected from the injection passage is oriented towards an ignition plug.

8. The two-cycle combustion engine as claimed in claim 1, wherein the injection passage includes an injection port opening into the cylinder bore and positioned opposite to the exhaust port opening into the cylinder bore about a longitudinal axis of the cylinder block.

9. The two-cycle combustion engine as claimed in claim 1, wherein the injection passage includes injection ports opening into the cylinder bore and positioned in the vicinity of and on respective sides of the exhaust port opening into the cylinder bore.

10. A two-cycle combustion engine comprising:
a cylinder block having a cylinder bore;
a piston drivingly mounted in the cylinder bore;
a crankcase mounted on the cylinder block;
a crankshaft coupled with the piston and rotatably mounted in the crankcase;
an air passageway for introducing air into the crankcase;
a carburetor operatively enabling an air-fuel mixture to be supplied to the cylinder bore, through an injection passageway; and
an insulator assembly mounting the carburetor on the cylinder block, the insulator assembly having a plurality of valves including a first valve for selectively opening/closing the air passageway, and a second valve for selectively opening/closing the injection passageway, wherein the insulator assembly is made of a synthetic resin and .the first and second valves are check valves.

11. The two-cycle combustion engine as claimed in claim 10 wherein the first and second valves are reed valves.

12. The two-cycle combustion engine as claimed in claim 10 further including a scavenge air passageway for connecting the crankcase air with the cylinder bore.

13. A two-cycle combustion engine comprising:
a cylinder block having a cylinder bore;
a piston drivingly mounted in the cylinder bore;
a crankcase mounted on the cylinder block;
a crankshaft coupled with the piston and rotatably mounted in the crankcase;
an air passageway for introducing air into the crankcase;
a carburetor operatively enabling an air-fuel mixture to be supplied to the cylinder bore, through an injection passageway; and
an insulator assembly mounting the carburetor on the cylinder block, the insulator assembly having a plurality of valves including a first valve for selectively opening/closing the air passageway, and a second valve for selectively opening/closing the injection passageway,
wherein the insulator assembly includes the injection passageway and a third valve for selectively opening/closing the injection passageway.

14. The two-cycle combustion engine as claimed in claim 13 wherein the insulator assembly includes a fourth valve connected to the injection passageway and biased to open at a higher pressure level than the third valve to provide a pressure relief to the injection passageway.

15. The two-cycle combustion engine as claimed in claim 14 wherein the insulator assembly includes a recovery passageway connected to the fourth valve and a fuel tank connected to the recovery passageway.

16. A two-cycle combustion engine which comprises:
a cylinder block having a two-staged cylinder bore defined therein, said two-staged cylinder bore having a reduced diameter bore portion and a large diameter bore portion;
a two-staged piston having a reduced diameter piston portion and a large diameter piston portion and drivingly accommodated within the two-staged cylinder bore;
an annular auxiliary chamber defined between the large diameter bore portion of the two-staged cylinder bore and the reduced diameter piston portion of the two-staged piston;
an air passage for introducing air into a crank chamber;
an air-fuel mixture passage for introducing the air-fuel mixture into the auxiliary chamber;
a scavenge air passage for supplying the air within the crank chamber into a combustion chamber;
an injection passage for injecting the air-fuel mixture within the auxiliary chamber into the combustion chamber from an inner peripheral surface of the cylinder block in a direction oriented substantially diagonally upwardly;

a first check valve for selectively openingor closing the air passage;

a second check valve for selectively opening or closing the air-fuel mixture passage;

a third check valve for selectively opening or closing the injection passage; and a carburetor for preparing the air-fuel mixture by mixing air, supplied through an air cleaner, with fuel, said carburetor having a portion of the air passage in addition to a portion of the air-fuel mixture passage, and a single valve for adjusting an opening of each of the air-fuel mixture passage and air passage.

17. The two-cycle combustion engine as claimed in claim 16, wherein the carburetor is fitted to an engine body through an insulator, all of said first to third check valves being fitted to the insulator.

18. The two-cycle combustion engine, as claimed in claim 16, wherein the carburetor is fitted to an engine body through an insulator, and further comprising a relief valve for relieving a pressure inside the injection passage which is not lower than a predetermined value, and further comprising a recovery passage extending through the insulator for recovering the air-fuel mixture from the relief valve to a fuel tank.

19. The two-cycle combustion engine as claimed in claim 16, further comprising a fourth check valve comprising a relief valve for relieving a pressure inside the injection passage which is not lower than a predetermined value, the pressure at which the relief valve opens being so chosen as to be higher than the pressure at which the third check valve opens.

20. The two-cycle combustion engine as claimed in claim 16, wherein a direction in which the air-fuel mixture is injected from the injection passage is oriented towards an ignition plug.

* * * * *